United States Patent
Collins, II et al.

(10) Patent No.: US 10,025,138 B2
(45) Date of Patent: Jul. 17, 2018

(54) ILLUMINATING DISPLAY WITH LIGHT GATHERING STRUCTURE

(71) Applicant: Gentex Corporation, Zeeland, MI (US)

(72) Inventors: James D. Collins, II, Grandville, MI (US); Michael F. Lisowski, Holland, MI (US); Steven J. Veenman, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/615,360

(22) Filed: Jun. 6, 2017

(65) Prior Publication Data
US 2017/0351128 A1 Dec. 7, 2017

Related U.S. Application Data

(60) Provisional application No. 62/346,309, filed on Jun. 6, 2016.

(51) Int. Cl.
 *B60Q 1/26* (2006.01)
 *G02F 1/13357* (2006.01)
 (Continued)

(52) U.S. Cl.
 CPC ............ *G02F 1/1336* (2013.01); *B60R 1/088* (2013.01); *B60R 1/12* (2013.01); *F21V 14/003* (2013.01);
 (Continued)

(58) Field of Classification Search
 CPC .. B60R 1/04; B60R 1/088; B60R 1/12; B60R 2001/1253; F21V 14/003; G02B 6/0006; G02B 6/0008
 (Continued)

(56) References Cited

U.S. PATENT DOCUMENTS 2,131,888 A 10/1938 Harris
2,632,040 A 3/1953 Rabinow
(Continued)

FOREIGN PATENT DOCUMENTS

DE 102010064082 A1 6/2012
EP 0513476 11/1992
(Continued)

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.
(Continued)

*Primary Examiner* — Seung Lee
(74) *Attorney, Agent, or Firm* — Price Heneveld LLP; Bradley D. Johnson (57) ABSTRACT

A display mirror assembly having a housing. An electro-optic element is disposed within the housing. A light gathering structure is operably coupled with a first side of the electro-optic element and is configured to draw ambient light from outside the housing. A display module is disposed within the housing and is operable between an on state and an off state. A light relaying structure is operably coupled with a second side of the electro-optic element and is configured to relay light from the electro-optic element to a first edge of the display module. A backlit module is disposed at a second edge of the display module.

19 Claims, 2 Drawing Sheets

(51) Int. Cl.
*F21V 8/00* (2006.01)
*F21V 14/00* (2018.01)
*B60R 1/12* (2006.01)
*B60R 1/08* (2006.01)
*F21Y 115/10* (2016.01)
*G02F 1/1335* (2006.01)
*B60R 1/04* (2006.01)

(52) U.S. Cl.
CPC ......... *G02B 6/0006* (2013.01); *G02B 6/0008* (2013.01); *B60R 1/04* (2013.01); *B60R 2001/1253* (2013.01); *F21Y 2115/10* (2016.08); *G02F 2001/133618* (2013.01)

(58) Field of Classification Search
USPC ......................................................... 362/494
See application file for complete search history.

(56) References Cited

U.S. PATENT DOCUMENTS

| | | |
|---|---|---|
| 2,827,594 A | 3/1958 | Rabinow |
| 3,179,845 A | 4/1965 | Kulwiec |
| 3,280,701 A | 10/1966 | Donnelly et al. |
| 3,581,276 A | 5/1971 | Newman |
| 3,663,819 A | 5/1972 | Hicks et al. |
| 3,837,129 A | 9/1974 | Losell |
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| D283,998 S | 5/1986 | Tanaka |
| 4,599,544 A | 7/1986 | Martin |
| 4,630,904 A | 12/1986 | Pastore |
| 4,638,287 A | 1/1987 | Umebayashi et al. |
| 4,645,975 A | 2/1987 | Meitzler et al. |
| 4,665,321 A | 5/1987 | Chang et al. |
| 4,665,430 A | 5/1987 | Hiroyasu |
| 4,692,798 A | 9/1987 | Seko et al. |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,902,108 A | 2/1990 | Byker |
| 4,910,591 A | 3/1990 | Petrossian et al. |
| 4,930,742 A | 6/1990 | Schofield et al. |
| 4,934,273 A | 6/1990 | Endriz |
| 4,967,319 A | 10/1990 | Seko |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | Macks |
| 5,052,163 A | 10/1991 | Czekala |
| 5,066,112 A | 11/1991 | Lynam et al. |
| 5,069,535 A | 12/1991 | Baucke et al. |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,115,346 A | 5/1992 | Lynam |
| 5,121,200 A | 6/1992 | Choi et al. |
| 5,124,549 A | 6/1992 | Michaels et al. |
| 5,128,799 A | 7/1992 | Byker |
| 5,151,824 A | 9/1992 | O'Farrell |
| 5,158,638 A | 10/1992 | Osanami et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,230,400 A | 7/1993 | Kakainami et al. |
| 5,235,178 A | 8/1993 | Hegyi |
| 5,243,417 A | 9/1993 | Pollard |
| 5,253,109 A | 10/1993 | O'Farrell et al. |
| 5,278,693 A | 1/1994 | Theiste |
| 5,280,380 A | 1/1994 | Byker |
| 5,282,077 A | 1/1994 | Byker |
| 5,289,321 A | 2/1994 | Secor |
| 5,294,376 A | 3/1994 | Byker |
| 5,296,924 A | 3/1994 | Blancard et al. |
| D346,356 S | 4/1994 | Leu |
| 5,304,980 A | 4/1994 | Maekawa |
| 5,329,206 A | 7/1994 | Slotkowski et al. |
| 5,336,448 A | 8/1994 | Byker |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,379,146 A | 1/1995 | Defendini |
| 5,381,309 A | 1/1995 | Borchardt |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,421,940 A | 6/1995 | Cornils et al. |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,448,397 A | 9/1995 | Tonar |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |
| 5,592,146 A | 1/1997 | Kover, Jr. et al. |
| 5,602,542 A | 2/1997 | Windmann et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,649,756 A | 7/1997 | Adams et al. |
| 5,650,765 A | 7/1997 | Park |
| 5,660,454 A | 8/1997 | Mori et al. |

(56) References Cited

U.S. PATENT DOCUMENTS

| | | |
|---|---|---|
| 5,666,028 A | 9/1997 | Bechtel et al. |
| 5,670,935 A | 9/1997 | Schofield et al. |
| 5,679,283 A | 10/1997 | Tonar |
| 5,680,123 A | 10/1997 | Lee |
| 5,682,267 A | 10/1997 | Tonar |
| 5,684,473 A | 11/1997 | Hibino et al. |
| 5,689,370 A | 11/1997 | Tonar |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,729,194 A | 3/1998 | Spears et al. |
| 5,736,816 A | 4/1998 | Strenke et al. |
| 5,742,026 A | 4/1998 | Dickinson |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |
| 5,786,787 A | 7/1998 | Eriksson et al. |
| 5,790,298 A | 8/1998 | Tonar |
| 5,793,308 A | 8/1998 | Rosinski et al. |
| 5,793,420 A | 8/1998 | Schmidt |
| 5,796,094 A | 8/1998 | Schofield et al. |
| 5,798,727 A | 8/1998 | Shirai et al. |
| 5,803,579 A | 9/1998 | Turnbull |
| 5,808,778 A | 9/1998 | Bauer et al. |
| 5,811,888 A | 9/1998 | Hsieh |
| 5,812,321 A | 9/1998 | Schierbeek et al. |
| 5,818,625 A | 10/1998 | Forgette et al. |
| 5,825,527 A | 10/1998 | Forgette et al. |
| D400,481 S | 11/1998 | Stephens et al. |
| D401,200 S | 11/1998 | Huang |
| 5,837,994 A | 11/1998 | Stam |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |
| 5,867,214 A | 2/1999 | Anderson et al. |
| 5,877,897 A | 3/1999 | Schofield et al. |
| 5,883,739 A | 3/1999 | Ashihara et al. |
| 5,888,431 A | 3/1999 | Tonar et al. |
| 5,896,119 A | 4/1999 | Evanicky et al. |
| 5,904,729 A | 5/1999 | Ruzicka |
| 5,905,457 A | 5/1999 | Rashid |
| D410,607 S | 6/1999 | Carter |
| 5,912,534 A | 6/1999 | Benedict |
| 5,923,027 A | 7/1999 | Stam |
| 5,923,457 A | 7/1999 | Byker et al. |
| 5,928,572 A | 7/1999 | Tonar et al. |
| 5,935,613 A | 8/1999 | Benham et al. |
| 5,940,011 A | 8/1999 | Agravante et al. |
| 5,940,201 A | 8/1999 | Ash et al. |
| 5,942,853 A | 8/1999 | Piscart |
| 5,949,331 A | 9/1999 | Schofield et al. |
| 5,956,012 A | 9/1999 | Turnbull et al. |
| 5,956,079 A | 9/1999 | Ridgley |
| 5,956,181 A | 9/1999 | Lin |
| 5,959,555 A | 9/1999 | Furuta |
| 5,990,469 A | 11/1999 | Bechtel |
| 5,998,617 A | 12/1999 | Srinivasa |
| 6,002,511 A | 12/1999 | Varaprasad |
| 6,008,486 A | 12/1999 | Stam |
| 6,009,359 A | 12/1999 | El-Hakim et al. |
| 6,018,308 A | 1/2000 | Shirai |
| 6,020,987 A | 2/2000 | Baumann |
| 6,023,040 A | 2/2000 | Zahavi |
| 6,023,229 A | 2/2000 | Bugno et al. |
| 6,025,872 A | 2/2000 | Ozaki et al. |
| 6,037,471 A | 3/2000 | Srinivasa |
| 6,043,452 A | 3/2000 | Bestenlehrer |
| 6,046,766 A | 4/2000 | Sakata |
| 6,049,171 A | 4/2000 | Stam |
| 6,051,956 A | 4/2000 | Nakashimo |
| 6,060,989 A | 5/2000 | Gehlot |
| 6,061,002 A | 5/2000 | Weber et al. |
| 6,062,920 A | 5/2000 | Jordan |
| 6,064,508 A | 5/2000 | Forgette et al. |
| 6,064,509 A | 5/2000 | Tonar et al. |
| 6,067,111 A | 5/2000 | Hahn et al. |
| 6,068,380 A | 5/2000 | Lynn et al. |
| 6,072,391 A | 6/2000 | Suzuki et al. |
| 6,078,355 A | 6/2000 | Zengel |
| 6,084,700 A | 7/2000 | Knapp |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,111,683 A | 8/2000 | Cammenga |
| 6,111,684 A | 8/2000 | Forgette |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel |
| 6,130,448 A | 10/2000 | Bauer et al. |
| 6,132,072 A | 10/2000 | Turnbull |
| 6,140,933 A | 10/2000 | Bugno |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,629 A | 12/2000 | Andreas |
| 6,166,698 A | 12/2000 | Turnbull et al. |
| 6,166,848 A | 12/2000 | Cammenga et al. |
| 6,167,755 B1 | 1/2001 | Damson et al. |
| 6,170,956 B1 | 1/2001 | Rumsey et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,181,242 B1 | 1/2001 | Nguyen |
| 6,184,781 B1 | 2/2001 | Ramakesavan |
| 6,185,492 B1 | 2/2001 | Kagawa et al. |
| 6,188,505 B1 | 2/2001 | Lomprey |
| 6,191,704 B1 | 2/2001 | Takenaga et al. |
| 6,193,378 B1 | 2/2001 | Tonar et al. |
| 6,193,912 B1 | 2/2001 | Theiste |
| 6,195,194 B1 | 2/2001 | Roberts et al. |
| 6,200,010 B1 | 3/2001 | Anders |
| 6,218,934 B1 | 4/2001 | Regan |
| 6,222,177 B1 | 4/2001 | Bechtel |
| 6,222,447 B1 | 4/2001 | Schofield et al. |
| 6,224,716 B1 | 5/2001 | Yoder |
| 6,229,435 B1 | 5/2001 | Knapp |
| 6,239,898 B1 | 5/2001 | Byker |
| 6,239,899 B1 | 5/2001 | Devries et al. |
| 6,244,716 B1 | 6/2001 | Steenwyk |
| 6,246,507 B1 | 6/2001 | Bauer |
| 6,247,819 B1 | 6/2001 | Turnbull |
| 6,249,214 B1 | 6/2001 | Kashiwazaki |
| 6,249,369 B1 | 6/2001 | Theiste et al. |
| 6,250,766 B1 | 6/2001 | Strumolo et al. |
| 6,255,639 B1 | 7/2001 | Stam |
| 6,259,475 B1 | 7/2001 | Ramachandran et al. |
| 6,262,831 B1 | 7/2001 | Bauer |
| 6,262,832 B1 | 7/2001 | Lomprey |
| 6,265,968 B1 | 7/2001 | Betzitza et al. |
| 6,268,803 B1 | 7/2001 | Gunderson et al. |
| 6,268,950 B1 | 7/2001 | Ash |
| 6,269,308 B1 | 7/2001 | Kodaka et al. |
| 6,281,632 B1 | 8/2001 | Stam |
| 6,281,804 B1 | 8/2001 | Haller et al. |
| 6,289,332 B2 | 9/2001 | Menig et al. |
| 6,291,812 B1 | 9/2001 | Bechtel |
| 6,300,879 B1 | 10/2001 | Regan et al. |
| 6,304,173 B2 | 10/2001 | Pala et al. |
| 6,313,457 B1 | 11/2001 | Bauer |
| 6,313,892 B2 | 11/2001 | Gleckman |
| 6,317,057 B1 | 11/2001 | Lee |

(56) References Cited

U.S. PATENT DOCUMENTS

| | | |
|---|---|---|
| 6,317,248 B1 | 11/2001 | Agrawal et al. |
| 6,320,612 B1 | 11/2001 | Young |
| 6,324,295 B1 | 11/2001 | Avionique et al. |
| D451,869 S | 12/2001 | Knapp et al. |
| 6,329,925 B1 | 12/2001 | Skiver et al. |
| 6,330,511 B2 | 12/2001 | Ogura et al. |
| 6,335,548 B1 | 1/2002 | Roberts |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,782 B1 | 2/2002 | Sekiya et al. |
| 6,356,206 B1 | 3/2002 | Takenaga et al. |
| 6,356,376 B1 | 3/2002 | Tonar |
| 6,357,883 B1 | 3/2002 | Strumolo et al. |
| 6,359,274 B1 | 3/2002 | Nixon |
| 6,363,326 B1 | 3/2002 | Scully |
| 6,369,701 B1 | 4/2002 | Yoshida et al. |
| 6,379,013 B1 | 4/2002 | Bechtel |
| 6,392,783 B1 | 5/2002 | Lomprey |
| 6,396,040 B1 | 5/2002 | Hill |
| 6,396,397 B1 | 5/2002 | Bos et al. |
| 6,402,328 B1 | 6/2002 | Bechtel |
| 6,403,942 B1 | 6/2002 | Stam |
| 6,407,468 B1 | 6/2002 | Levesque et al. |
| 6,407,847 B1 | 6/2002 | Poll et al. |
| 6,408,247 B1 | 6/2002 | Ichikawa et al. |
| 6,412,959 B1 | 7/2002 | Tseng |
| 6,415,230 B1 | 7/2002 | Maruko et al. |
| 6,420,800 B1 | 7/2002 | Levesque |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,426,485 B1 | 7/2002 | Bulajajewski |
| 6,428,172 B1 | 8/2002 | Hutzel et al. |
| 6,429,594 B1 | 8/2002 | Stam |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,441,943 B1 | 8/2002 | Roberts |
| 6,442,465 B2 | 8/2002 | Breed et al. |
| 6,443,585 B1 | 9/2002 | Saccomanno |
| 6,443,602 B1 | 9/2002 | Tanabe et al. |
| 6,447,128 B1 | 9/2002 | Lang et al. |
| 6,447,130 B2 | 9/2002 | Chu |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,465,963 B1 | 10/2002 | Turnbull |
| 6,466,701 B1 | 10/2002 | Ejiri et al. |
| 6,469,739 B1 | 10/2002 | Bechtel |
| 6,471,362 B1 | 10/2002 | Carter |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | Deline et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,504,142 B2 | 1/2003 | Nixon |
| 6,507,779 B2 | 1/2003 | Breed et al. |
| 6,512,624 B2 | 1/2003 | Tonar |
| 6,515,581 B1 | 2/2003 | Ho |
| 6,515,597 B1 | 2/2003 | Wada et al. |
| 6,520,667 B1 | 2/2003 | Mousseau |
| 6,521,916 B2 | 2/2003 | Roberts |
| 6,522,969 B2 | 2/2003 | Kannonji |
| 6,523,976 B1 | 2/2003 | Turnbull |
| D471,847 S | 3/2003 | Rumsey et al. |
| 6,535,126 B2 | 3/2003 | Lin et al. |
| 6,542,085 B1 | 4/2003 | Yang |
| 6,542,182 B1 | 4/2003 | Chutorash |
| 6,545,598 B1 | 4/2003 | De Villeroche |
| 6,545,794 B2 | 4/2003 | Ash |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,572,233 B1 | 6/2003 | Northman et al. |
| 6,580,373 B1 | 6/2003 | Ohashi |
| 6,581,007 B2 | 6/2003 | Hasegawa et al. |
| 6,583,730 B2 | 6/2003 | Lang et al. |
| 6,575,643 B2 | 7/2003 | Takashashi |
| 6,587,573 B1 | 7/2003 | Stam |
| 6,591,192 B2 | 7/2003 | Okamura et al. |
| 6,594,583 B2 | 7/2003 | Ogura et al. |
| 6,594,614 B2 | 7/2003 | Studt et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle |
| 6,611,610 B1 | 8/2003 | Stam et al. |
| 6,611,759 B2 | 8/2003 | Brosche |
| 6,612,708 B2 | 9/2003 | Chu |
| 6,614,387 B1 | 9/2003 | Deadman |
| 6,614,579 B2 | 9/2003 | Roberts et al. |
| 6,616,764 B2 | 9/2003 | Kramer et al. |
| 6,617,564 B2 | 9/2003 | Ockerse et al. |
| 6,618,672 B2 | 9/2003 | Sasaki et al. |
| 6,630,888 B2 | 10/2003 | Lang et al. |
| 6,631,316 B2 | 10/2003 | Stam et al. |
| 6,635,194 B2 | 10/2003 | Kloeppner |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,650,457 B2 | 11/2003 | Busscher et al. |
| 6,657,767 B2 | 12/2003 | Bonardi |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pochmuller |
| 6,683,539 B2 | 1/2004 | Trajkovic et al. |
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarty et al. |
| 6,693,518 B2 | 2/2004 | Kumata |
| 6,693,519 B2 | 2/2004 | Keirstead |
| 6,693,524 B1 | 2/2004 | Payne |
| 6,700,692 B2 | 3/2004 | Tonar |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,746,122 B2 | 6/2004 | Knox |
| D493,131 S | 7/2004 | Lawlor et al. |
| D493,394 S | 7/2004 | Lawlor et al. |
| 6,768,566 B2 | 7/2004 | Walker |
| 6,772,057 B2 | 8/2004 | Breed et al. |
| 6,774,988 B2 | 8/2004 | Stam |
| 6,781,738 B2 | 8/2004 | Kikuchi et al. |
| 6,816,145 B1 | 11/2004 | Evanicky |
| 6,816,297 B1 | 11/2004 | Tonar |
| D499,678 S | 12/2004 | Bradley |
| 6,846,098 B2 | 1/2005 | Bourdelais et al. |
| 6,847,487 B2 | 1/2005 | Burgner |
| 6,853,413 B2 | 2/2005 | Larson |
| 6,861,809 B2 | 3/2005 | Stam |
| 6,870,656 B2 | 3/2005 | Tonar et al. |
| 6,902,284 B2 | 6/2005 | Hutzel et al. |
| 6,902,307 B2 | 6/2005 | Strazzanti |
| 6,912,001 B2 | 6/2005 | Okamoto et al. |
| 6,913,375 B2 | 7/2005 | Strazzanti |
| 6,923,080 B1 | 8/2005 | Dobler et al. |

(56) References Cited

U.S. PATENT DOCUMENTS

| | | | |
|---|---|---|---|
| 6,930,737 B2 | 8/2005 | Weindorf et al. |
| 6,934,080 B2 | 8/2005 | Saccomanno et al. |
| 6,946,978 B2 | 9/2005 | Schofield |
| 6,958,495 B2 | 10/2005 | Nishijima et al. |
| 6,968,273 B2 | 11/2005 | Ockerse |
| 7,008,090 B2 * | 3/2006 | Blank | B60Q 1/2665 |
| | | | 362/276 |
| 7,012,543 B2 | 3/2006 | Deline et al. |
| 7,038,577 B2 | 5/2006 | Pawlicki et al. |
| 7,042,616 B2 | 5/2006 | Tonar et al. |
| 7,046,448 B2 | 5/2006 | Burgner |
| 7,064,882 B2 | 6/2006 | Tonar |
| 7,175,291 B1 | 2/2007 | Li |
| 7,255,465 B2 | 8/2007 | Deline et al. |
| 7,262,406 B2 | 8/2007 | Heslin et al. |
| 7,265,342 B2 | 9/2007 | Heslin et al. |
| D553,061 S | 10/2007 | Schmidt et al. |
| 7,285,903 B2 | 10/2007 | Cull et al. |
| 7,287,868 B2 | 10/2007 | Carter |
| 7,289,037 B2 * | 10/2007 | Uken | B60K 35/00 |
| | | | 340/425.5 |
| 7,292,208 B1 | 11/2007 | Park et al. |
| 7,311,428 B2 | 12/2007 | Deline et al. |
| 7,321,112 B2 | 1/2008 | Stam et al. |
| 7,324,261 B2 | 1/2008 | Tonar et al. |
| 7,338,190 B2 | 3/2008 | Blank |
| 7,342,707 B2 | 3/2008 | Roberts |
| 7,349,143 B2 | 3/2008 | Tonar et al. |
| 7,360,932 B2 | 4/2008 | Uken et al. |
| 7,417,221 B2 | 8/2008 | Creswick et al. |
| 7,417,717 B2 | 8/2008 | Pack |
| 7,446,650 B2 | 11/2008 | Scholfield et al. |
| 7,467,883 B2 | 12/2008 | Deline et al. |
| 7,468,651 B2 | 12/2008 | Deline et al. |
| 7,505,047 B2 | 3/2009 | Yoshimura |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,592,563 B2 | 9/2009 | Wissenbach |
| 7,619,508 B2 | 11/2009 | Lynam et al. |
| 7,626,749 B2 | 12/2009 | Baur et al. |
| 7,653,215 B2 | 1/2010 | Stam |
| 7,658,521 B2 | 2/2010 | Deline et al. |
| 7,663,798 B2 | 2/2010 | Tonar |
| 7,683,326 B2 | 3/2010 | Stam et al. |
| 7,688,495 B2 | 3/2010 | Tonar et al. |
| 7,706,046 B2 | 4/2010 | Bauer et al. |
| 7,711,479 B2 | 5/2010 | Taylor et al. |
| 7,719,408 B2 | 5/2010 | Deward et al. |
| 7,720,580 B2 | 5/2010 | Higgins-Luthman |
| 7,746,534 B2 | 6/2010 | Tonar et al. |
| 7,815,326 B2 | 10/2010 | Blank et al. |
| 7,817,020 B2 | 10/2010 | Turnbull et al. |
| 7,821,696 B2 | 10/2010 | Tonar et al. |
| 7,830,583 B2 | 11/2010 | Neuman et al. |
| 7,855,755 B2 * | 12/2010 | Weller | B60R 1/12 |
| | | | 340/425.5 |
| 7,864,399 B2 | 1/2011 | McCabe et al. |
| 7,877,175 B2 | 1/2011 | Higgins-Luthman |
| 7,881,496 B2 | 2/2011 | Camilleri et al. |
| 7,881,839 B2 | 2/2011 | Stam et al. |
| 7,888,629 B2 | 2/2011 | Heslin et al. |
| 7,914,188 B2 | 3/2011 | Deline et al. |
| 7,972,045 B2 | 7/2011 | Schofield |
| 7,978,393 B2 | 7/2011 | Tonar et al. |
| 7,994,471 B2 | 8/2011 | Heslin et al. |
| 8,031,225 B2 | 10/2011 | Watanabe et al. |
| 8,035,881 B2 | 10/2011 | Luten et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,095,310 B2 | 1/2012 | Taylor et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,194,133 B2 | 6/2012 | DeWind et al. |
| 8,201,800 B2 | 6/2012 | Filipiak |
| 8,203,433 B2 | 6/2012 | Deuber et al. |
| 8,217,830 B2 | 7/2012 | Lynam |
| 8,222,588 B2 | 7/2012 | Schofield et al. |
| 8,237,909 B2 | 8/2012 | Ostreko et al. |
| 8,258,433 B2 | 9/2012 | Byers et al. |
| 8,282,226 B2 | 10/2012 | Blank et al. |
| 8,288,711 B2 * | 10/2012 | Heslin | B60R 1/04 |
| | | | 250/208.1 |
| 8,325,028 B2 | 12/2012 | Schofield et al. |
| 8,411,245 B2 | 4/2013 | Lee et al. |
| 8,482,683 B2 | 7/2013 | Hwang et al. |
| 8,520,069 B2 | 8/2013 | Haler |
| 8,559,092 B2 | 10/2013 | Bugno et al. |
| 8,564,662 B2 | 10/2013 | Busch et al. |
| 8,582,052 B2 * | 11/2013 | Ockerse | B60R 1/12 |
| | | | 345/36 |
| 8,779,910 B2 | 7/2014 | DeLine et al. |
| 8,879,139 B2 | 11/2014 | Fish, Jr. et al. |
| D729,714 S | 5/2015 | Roth |
| 9,057,875 B2 | 6/2015 | Fish, Jr. et al. |
| 9,134,585 B2 | 9/2015 | Tonar et al. |
| D746,744 S | 1/2016 | Sloterbeek et al. |
| 9,319,639 B1 | 4/2016 | Englander et al. |
| D755,097 S | 5/2016 | Lin |
| 9,505,349 B2 | 11/2016 | Fish, Jr. et al. |
| 9,575,315 B2 | 2/2017 | Lee et al. |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |

(56) References Cited

U.S. PATENT DOCUMENTS

| | | |
|---|---|---|
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 1/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0196577 A1 | 10/2004 | Carter et al. |
| 2004/0202001 A1 | 10/2004 | Roberts et al. |
| 2005/0099693 A1 | 5/2005 | Schofield et al. |
| 2005/0140855 A1 | 6/2005 | Utsumi |
| 2005/0237440 A1 | 10/2005 | Sugimura et al. |
| 2006/0007550 A1 | 1/2006 | Tonar et al. |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2007/0146481 A1 | 6/2007 | Chen et al. |
| 2007/0171037 A1 | 7/2007 | Schofield et al. |
| 2008/0030836 A1 | 2/2008 | Tonar et al. |
| 2008/0068520 A1 | 3/2008 | Minikey, Jr. et al. |
| 2008/0192132 A1 | 8/2008 | Bechtel et al. |
| 2008/0247192 A1 | 10/2008 | Hoshi et al. |
| 2008/0294315 A1 | 11/2008 | Breed |
| 2008/0302657 A1 | 12/2008 | Luten et al. |
| 2009/0015736 A1 | 1/2009 | Weller et al. |
| 2009/0141516 A1 | 6/2009 | Wu et al. |
| 2009/0296190 A1 | 12/2009 | Anderson et al. |
| 2010/0110553 A1 | 5/2010 | Anderson et al. |
| 2010/0194890 A1 | 8/2010 | Weller et al. |
| 2010/0201896 A1 | 8/2010 | Ostreko et al. |
| 2010/0277786 A1 | 11/2010 | Anderson et al. |
| 2010/0289995 A1 | 11/2010 | Hwang et al. |
| 2010/0328463 A1 | 12/2010 | Haler |
| 2011/0168687 A1 | 7/2011 | Door |
| 2011/0176323 A1 | 7/2011 | Skiver et al. |
| 2011/0181727 A1 | 7/2011 | Weller et al. |
| 2011/0317015 A1 | 12/2011 | Seto et al. |
| 2012/0038964 A1 | 2/2012 | De Wind et al. |
| 2012/0069444 A1 | 3/2012 | Campbell et al. |
| 2012/0182242 A1 | 7/2012 | Lindahl et al. |
| 2012/0229882 A1 | 9/2012 | Fish, Jr. et al. |
| 2012/0236388 A1 | 9/2012 | De Wind et al. |
| 2013/0028473 A1 | 1/2013 | Hilldore et al. |
| 2013/0170013 A1 | 7/2013 | Tonar et al. |
| 2013/0279014 A1 | 10/2013 | Fish, Jr. et al. |
| 2014/0022390 A1 | 1/2014 | Blank et al. |
| 2014/0043479 A1 | 2/2014 | Busch et al. |
| 2014/0192431 A1 | 7/2014 | Sloterbeek et al. |
| 2014/0347488 A1 | 11/2014 | Tazaki et al. |
| 2016/0137133 A1 | 5/2016 | VanderPloeg et al. |
| 2016/0341963 A1 | 11/2016 | Minikey, Jr. et al. |
| 2017/0248787 A1 | 8/2017 | Lee et al. |

FOREIGN PATENT DOCUMENTS

| | | |
|---|---|---|
| EP | 434453 B1 | 4/1997 |
| EP | 0667254 B1 | 10/1997 |
| EP | 0899157 A1 | 3/1999 |
| EP | 0744321 B1 | 11/2001 |
| EP | 0899157 B1 | 10/2004 |
| EP | 2393691 B1 | 5/2014 |
| EP | 2789505 A1 | 10/2014 |
| EP | 2845921 A2 | 3/2015 |
| GB | 2338363 | 12/1999 |
| JP | H07267002 A | 10/1995 |
| JP | 1178693 | 3/1999 |
| JP | 3070845 U | 8/2000 |
| JP | 2002096685 A | 4/2002 |
| JP | 2002120649 A | 4/2002 |
| JP | 2002200936 A | 7/2002 |
| JP | 2005148119 | 6/2005 |
| JP | 2005327600 | 11/2005 |
| JP | 2008139819 A | 6/2008 |
| JP | 2009542505 A | 12/2009 |
| JP | 2010173460 A | 8/2010 |
| JP | 2013037334 A | 2/2013 |
| JP | 2013244753 | 12/2013 |
| KR | 20100123433 A | 11/2010 |
| WO | 9621581 | 7/1996 |
| WO | 2007006104 A1 | 1/2007 |
| WO | 2007103573 A2 | 9/2007 |
| WO | 2010090964 | 8/2010 |
| WO | 2011044312 A1 | 4/2011 |
| WO | 2013084622 A1 | 6/2013 |
| WO | 2013162985 A1 | 10/2013 |

OTHER PUBLICATIONS

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems," Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications," Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al., "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

(56) References Cited

OTHER PUBLICATIONS

Knoll, "The Use of Displays in Automotive Applications," Journal of the SID 5/3 1997, pp. 165-172, 315-316, Stuttgart, Germany.
Donofrio, "Looking Beyond the Dashboard," SID 2002, pp. 30-34, Ann Arbor, MI.
Stone, "Automotive Display Specification," Proceedings of the Vehicle Display Symposium, 1995, pp. 93-96, Society for Information Display, Detroit Center, Santa Ana, CA.
International Searching Authority, International Search Report and Written Opinion for International Application No. PCT/US2013/037080, dated Aug. 29, 2013, 6 pages.
Japanese Patent Office, Official Action for Japanese Application No. 2015-509030, dated Jan. 18, 2016, 15 pages.
State Intellectual Property Office of the People's Republic of China, Notification of the First Office Action for Chinese Application No. 201380028888.3, dated Apr. 6, 2016, 15 pages.
International Searching Authority, International Search Report and Written Opinion for International Application No. PCT/US2016/028267 dated Sep. 8, 2016 (8 Pages).
Federal Institute of Industrial Property, "International Search Report and the Written Opinion of the International Searching Authority," dated Mar. 16, 2017 (9 pages).
Australian Government/IP Australia, "Examination report No. 1 for standard patent application," dated Mar. 3, 2017 (3 pages).

* cited by examiner

ILLUMINATING DISPLAY WITH LIGHT GATHERING STRUCTURE

CROSS-REFERENCE TO RELATED APPLICATION

This application claims priority to and the benefit under 37 U.S.C. § 119(e) of U.S. Provisional Application No. 62/346,309, filed on Jun. 6, 2016, entitled "ILLUMINATING DISPLAY WITH LIGHT GATHERING STRUCTURE," the disclosure of which is hereby incorporated herein by reference in its entirety.

BACKGROUND OF THE DISCLOSURE

The present disclosure generally relates to a display mirror assembly, and more particularly to a display mirror assembly having an illuminating display with fiber optics and light emitting diode backlighting.

SUMMARY OF THE DISCLOSURE

One aspect of the disclosure includes a display mirror assembly having a housing. An electro-optic element is disposed within the housing. A light gathering structure is operably coupled with a first side of the electro-optic element and is configured to draw ambient light from outside the housing. A display module is disposed within the housing and is operable between an on state and an off state. A light relaying structure is operably coupled with a second side of the electro-optic element and is configured to relay light from the electro-optic element to a first edge of the display module. A backlit module is disposed at a second edge of the display module.

Another aspect of the disclosure includes a rearview device having a housing defining a forward opening. A light restricting device is disposed within the housing. A light gathering structure is operably coupled with a first side of the light restricting device and is configured to draw ambient light from outside the housing. A display module is disposed within the housing and is configured to display an image toward the forward opening. A light relaying structure is operably coupled with a second side of the light restricting device and is configured to relay light to the display module. The light relaying structure is disposed between the forward opening and the display module.

Still another aspect of the disclosure includes a rearview device having a housing defining a forward opening. A light restricting device is disposed within the housing and includes an electro-optic element. An external fiber optic element is operably coupled with a first side of the light restricting device and is configured to draw ambient light from outside the housing. A display module is disposed within the housing. An internal fiber optic element is operably coupled with a second side of the light restricting device and is configured to relay light from the electro-optic element to the display module. The electro-optic element is disposed between the forward opening and the display module.

In still another aspect of the present disclosure, a rearview device includes a housing supporting a first electro-optic element proximate an opening of the housing. A second electro-optic element is disposed within the housing and includes an external fiber optic element operably coupled with a first side of the second electro-optic element and is configured to draw ambient light from outside the housing. A display module is disposed within the housing. An internal fiber optic element is operably coupled with a second side of the second electro-optic element and is configured to relay light from the second electro-optic element to the display module. The rearview device provides a thin-profile, low cost and energy efficient manner of providing light to the display module.

These and other features, advantages, and objects of the present disclosure will be further understood and appreciated by those skilled in the art by reference to the following specification, claims, and appended drawings.

DETAILED DESCRIPTION OF EMBODIMENTS

Figure 1:
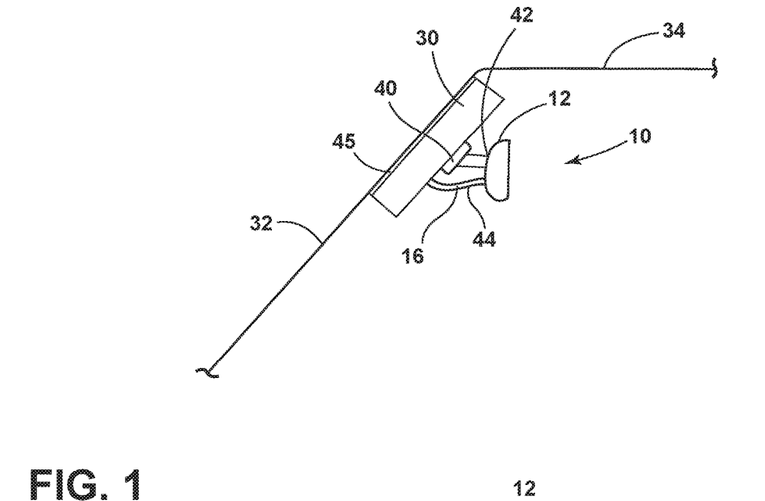
FIG. 1 is a side elevational schematic view of one embodiment of a mirror assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 2:
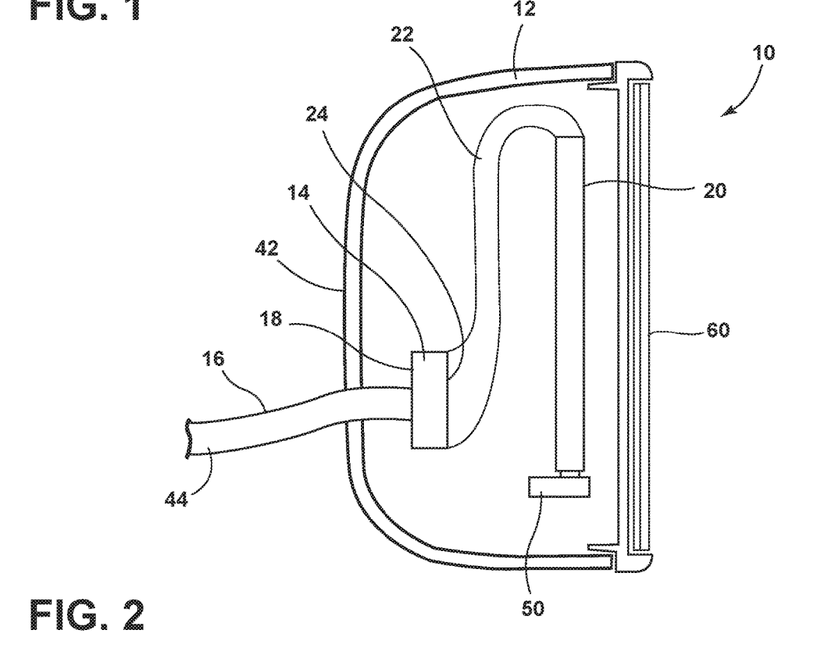
FIG. 2 is an enlarged side cross-sectional view of the mirror assembly of FIG. 1.
Figure 3:
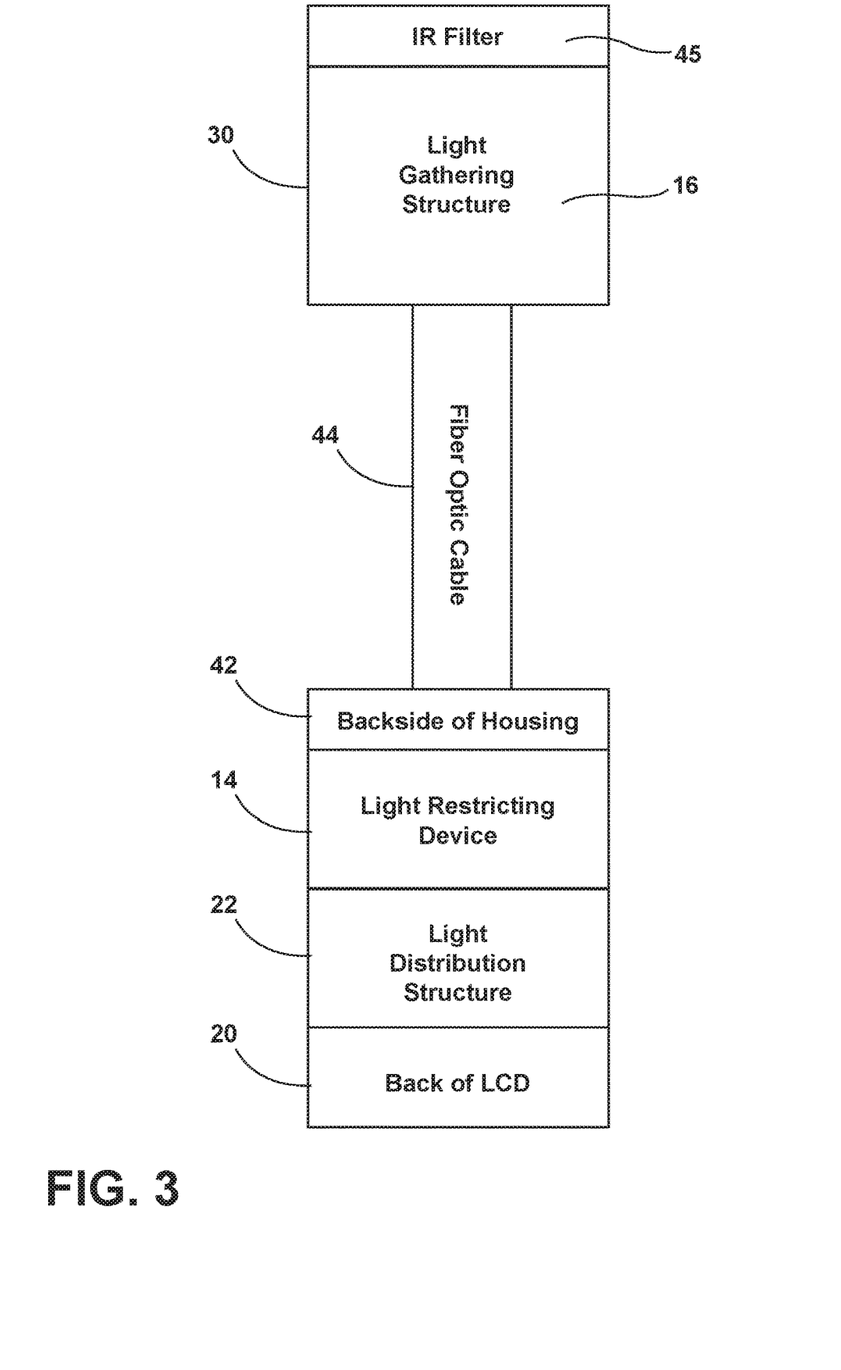
FIG. 3 is a schematic illustration portraying the order of components of one embodiment of the present disclosure.

Referring to FIGS. 1-3, reference numeral 10 generally designates a display mirror assembly having a housing 12. A light restricting device in the form of an electro-optic element 14, which may be a partially reflective, partially transmissive element, is disposed within the housing 12. A light gathering structure 16 is operably coupled with a first side 18 of the electro-optic element 14 and is configured to draw ambient light from outside the housing 12. A display module 20 is disposed within the housing 12 and is operable between an on state and an off state. An internal light relaying structure 22 is operably coupled with a second side 24 of the electro-optic element 14 and is configured to relay light from the electro-optic element 14 to the display module 20.

With reference once again FIGS. 1 and 2, the display mirror assembly 10 is generally configured for use inside of a vehicle to provide a display or a reflected image of a rearward scene of the vehicle. The internal light gathering structure 16 includes a light collection member 30 disposed proximate a front windscreen 32 of a vehicle. In the illustrated embodiment, the light collection member 30 is disposed on the front windscreen 32 proximate a headliner 34 of the vehicle. However, it will be generally understood that the light collection member 30 may be disposed at any position inside or outside of the vehicle that is likely to receive ambient light. Alternatively, the light collection member 30 may be positioned proximate an alternate light source of the vehicle that has excess or waste light that can be harvested and used to illuminate the display module 20. The light collection member 30 may include a variety of additional features, including infrared (IR) filters 45 or components related to operation of the display mirror assembly 10.

In the illustrated embodiment of FIG. 1, the light collection member 30 supports a mount 40 that is operably coupled with a rear portion 42 of the housing 12. It will be understood that the mount 40 may be also operably coupled with the front windscreen 32 directly. It will also be generally understood that the mount 40 is operably coupled with the rear portion 42 of the housing 12, or may be operably coupled with an internal portion of the housing 12. Regardless, the housing 12 will be pivotally coupled such that adjustment of the housing 12 can be made by a user. The light gathering structure 16 includes an external light relaying structure 44. The external light relaying structure 44 and the internal light relaying structure 22 may be constructed from a variety of materials, including a fiber optic cable or other light transmitting material. In addition, a forward electro-optic element 60 of the display mirror assembly 10 may include an electrochromic element or similar auto dimming assembly. The display module 20 of the display mirror assembly 10 may be constructed from a variety of materials, including liquid crystal display (LCD), light-emitting diode (LED), organic light-emitting diode (OLED), plasma, or digital light processing (DLP) display element. The internal light relaying structure 22 of the display mirror assembly 10 is generally configured to diffuse light from the electro-optic element 14, and redistribute the light to a first edge of the display module 20.

With reference again to FIG. 2, an LED backlit module 50 acts as a backlighting component that may be disposed proximate a second edge of the display module 20 for additional light to be transmitted to the display module 20. The LED backlit module 50 may be powered by wiring that extends through a rear wall of the housing 12. However, it is generally contemplated that the LED backlit module 50 can be adjusted to provide more or less light, regardless of ambient light conditions. In addition, the LED backlit module 50 may power on or off based on ambient light conditions, time of the day, user preferences, etc. The LED backlit module 50 may extend along one or more sides of the display module 20, depending on the application. The display mirror assembly 10 may also include multiple IR filters that filter light received by the light gathering structure 16. It is generally contemplated that any wavelength of light may be filtered by the light gathering structure 16.

With reference again to FIGS. 1 and 2, the illustrated embodiments provide a design that saves energy and provides a variable illuminated assembly that changes, depending on the ambient light. The electro-optic element 14 is generally configured to control the amount of light that is relayed through the internal light relaying structure 22 to the display module 20. Other light controlling assemblies can also be used instead of or in addition to the electro-optic element 14. For example, a light shutter, optic valve, or other form of light restricting device could be used to control the amount of light that is relayed from the light gathering structure 16 to the internal light relaying structure 22 and ultimately to the display module 20. In addition, as previously noted, the amount of light that is provided to the display module 20 can be supplemented by the LED backlit module 50.

With reference now to FIG. 3, a schematic is provided that generally illustrates one embodiment of the present disclosure. In the illustrated embodiment, light is scattered via the light gathering structure 16 through the IR filter 45 proximate the front windscreen 32 or other window of the vehicle. An external light relaying structure 44 in the form of a fiber optic cable or light pipe transfers light that is gathered by the light gathering structure 16 and into the rear portion 42 of the housing 12 and ultimately to the electro-optic element 14 that governs the amount of light that is transferred to the internal light relaying structure 22 (light distribution structure). The light is then relayed to the back of the display module 20, which in this case is an LCD. It will generally be understood that the LCD could be replaced with a variety of other similar technologies, including LEDs, OLEDs, and DLPs. It will be understood that the system may activate upon actuation of the LCD or display module 20, and that the light may be gathered from anywhere inside or outside the vehicle. In addition, the light gathering structure 16, and specifically the external light relaying structure 44, may extend through a variety of passages including the mount 40 of the display mirror assembly 10. Alternatively, the external light relaying structure 44 may be exposed to gather more light, which is ultimately transferred to the display module 20. Additionally, it will be understood that the order of the components may vary. For example, the light distribution structure 22 may be positioned behind the light restricting device 14, which, as previously noted, may be an electro-optic element or other form of device capable of restricting light.

Illuminating displays with light-emitting diodes alone can consume significant power, which can increase overall energy consumption within a vehicle. Consequently, the range of electric vehicles is lessened and the fuel efficiency of gas vehicles is lessened. Lighting the display mirror assembly 10 with an ambient lighting system, such as that set forth herein, optimizes energy use and provides an efficient manner to provide lighting to the display mirror assembly 10. Lighting displays with ambient light, coupled with LEDs, could also simplify the design. LED backlit curves are often fine-tuned, which is time intensive and costly. Illuminating the display mirror assembly 10 using natural light can minimize the time spent tuning LED backlit curves. In addition, the design generally provides for an illuminated display that changes naturally, depending on the ambient light. Stated differently, at night the brightness would be lessened because there is less ambient light, while during the day the amount of ambient light increases, and consequently the illuminated display also output more light.

Another benefit of the disclosure as set forth herein is that heat within the system is generally reduced. Still another benefit includes lessening the overall weight of the unit. This weight reduction occurs because the need for one or more powerful light sources is less. Accordingly, the design of the system is simpler and can be made with less concern of overheating.

The present disclosure may be used with assemblies such as those described in U.S. Pat. Nos. 9,174,577; 8,925,891; 8,814,373; 8,201,800; and 8,210,695; U.S. Patent Application Publication No. 2012/0327234; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,885,240; 8,814,373; 8,646,924; 8,643,931; and 8,264,761; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be appreciated that embodiments of the disclosure described herein may be comprised of one or more conventional processors and unique stored program instructions that control one or more processors to implement, in conjunction with certain non-processor circuits, some, most, or all of the functions of a display mirror assembly 10, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its form, couple, coupling, coupled, etc.) generally means the joining of two components (optically, electrically, or mechanically) directly or indirectly to one another. Such joining may be stationary in nature or movable in nature. Such joining may be achieved with the two components (optical, electrical, or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A display mirror assembly comprising:
   a housing;
   an electro-optic element disposed within the housing;
   a light gathering structure operably coupled with a first side of the electro-optic element and configured to draw ambient light from outside the housing;
   a display module disposed within the housing and operable between an on state and an off state;
   a light relaying structure operably coupled with a second side of the electro-optic element and configured to relay light from the electro-optic element to a first edge of the display module; and
   a backlit module disposed at a second edge of the display module.

2. The display mirror assembly of claim 1, wherein at least one of the light gathering structure and the light relaying structure includes a fiber optic cable.

3. The display mirror assembly of claim 1, wherein the electro-optic element is an electrochromic element.

4. The display mirror assembly of claim 1, wherein the display module is one of an LCD, LED, OLED, plasma, and DLP display element.

5. The display mirror assembly of claim 1, wherein the light relaying structure diffuses light from the electro-optic element and distributes the light to a first edge of the display module.

6. The display mirror assembly of claim 1, wherein the backlit module includes an LED backlit module proximate a second edge of the display module.

7. The display mirror assembly of claim 1, further comprising:
an infrared filter that filters light received by the light gathering structure.

8. A rearview device comprising:
a housing defining a forward opening;
a light restricting device disposed within the housing;
a light gathering structure operably coupled with a first side of the light restricting device and configured to draw ambient light from outside the housing;
a display module disposed within the housing and configured to display an image toward the forward opening; and
a light relaying structure operably coupled with a second side of the light restricting device and configured to relay light to the display module, the light relaying structure being disposed between the forward opening and the display module.

9. The rearview device of claim 8, wherein the light restricting device includes an electrochromic element.

10. The rearview device of claim 8, wherein the display module is one of an LCD, LED, OLED, plasma, and DLP display element.

11. The rearview device of claim 8, wherein the light relaying structure diffuses light from the electro-optic element and distributes the light to a first edge of the display module.

12. The rearview device of claim 8, further comprising:
an LED backlit module proximate a second edge of the display module.

13. The rearview device of claim 8, further comprising:
an infrared filter that filters light received by the light gathering structure.

14. A rearview device comprising:
a housing defining a forward opening;
a light restricting device disposed within the housing and including an electro-optic element;
an external fiber optic element operably coupled with a first side of the light restricting device and configured to draw ambient light from outside the housing;
a display module disposed within the housing; and
an internal fiber optic element operably coupled with a second side of the light restricting device and configured to relay light from the electro-optic element to the display module, wherein the electro-optic element is disposed between the forward opening and the display module.

15. The rearview device of claim 14, wherein the electro-optic element is a partially reflective, partially transmissive element.

16. The rearview device of claim 14, wherein the electro-optic element is an electrochromic element.

17. The rearview device of claim 14, wherein the display module is one of an LCD, LED, OLED, plasma, and DLP display element.

18. The rearview device of claim 14, wherein the internal fiber optic element diffuses light from the electro-optic element and distributes the light to a first edge of the display module.

19. The rearview device of claim 14, further comprising:
a backlit module disposed at a second edge of the display module.

* * * * *